United States Patent Office 2,877,261
Patented Mar. 10, 1959

2,877,261

PROCESS FOR NAPHTHALENE THIOGLYCOLLIC ACIDS

William B. Hardy, Bound Brook, and Jack H. Thelin and Frank M. Furman, Somerville, N. J., assignors to American Cyanamid Company, New York, N. Y., a corporation of Maine No Drawing. Original application November 9, 1956, Serial No. 621,199. Divided and this application March 25, 1957, Serial No. 647,951

8 Claims. (Cl. 260—470)

This invention relates to an improved process for the preparation of S-naphthyl thioglycollic acids and more particularly, to a process for the preparation of S-naphthyl thioglycollic acids by the reaction of naphthols and naphthol ethers with salts of S-esters of thiosulfuric acid in which the esterifying group on the thiosulfuric sulfur atom is carboxymethyl, esters of carboxymethyl, carboxamidomethyl and its N derivatives, or cyanomethyl.

The S-naphthyl derivatives of thioglycollic acid are important intermediates. Especially, S-beta-naphthyl thioglycollic acid is an important intermediate for the preparation of Indanthrene Brown RRD, a very well known thioindigoid vat dye of prototype 121. This dyestuff has been known for many years, and the particular intermediate thioglycollic acid derivative has been synthesized on a plant scale by one of two routes. In the first, naphthalene beta-sulfonic acid was converted to the acid chloride and this was reduced to the mercapto compound, thio-beta-naphthol, which could be reacted with chloracetic acid to give the beta-naphthol thioglycollic acid. This preparation has the very strong disadvantage of needing the reduction of a sulfonyl chloride, a process which is not easily carried out on a plant scale. The other preparation involves the diazotization of beta-naphthylamine (a compound known to be carcinogenic), followed by reaction of the diazo compound with a xanthate. The resulting naphthyl xanthate derivative was highly odoriferous and very unpleasant to work with on a plant scale. It was hydrolyzed to thio-beta-naphthol by reaction with caustic and then this latter compound was reacted with chloracetic acid. Both of these processes have the disadvantage of requiring a number of steps.

We have discovered that naphthyl thioglycollic acids can be prepared by the reaction of naphthols or naphthol ethers with salts of S-esters of thiosulfuric acid in the presence of an acid catalyst.

S-esters of thiosulfuric acid are prepared in the form of their salts by heating the proper organic halide with an inorganic thiosulfate. Usually sodium thiosulfate is used, resulting in the sodium salt being formed. Other salts are readily prepared by metathesis, especially those of heavy metals which readily precipitate from solutions of the sodium salt upon addition of the heavy metal ion. Alternatively, other thiosulfates can be used to prepare other salts directly by reaction with the appropriate organic halide. These salts have the structure: M—O—SO$_2$—S—R where M is the cation. Like thiosulfuric acid itself, these esters of thiosulfuric acid are not too stable in the acid form. The group R which esterifies the thiosulfuric acid on the sulfur atom can be carboxymethyl (—CH$_2$—COOH), esters of carboxymethyl (—CH$_2$—COOR′, in which R′ is an alkyl, alkenyl, aralkyl, or aryl radical such as is described below for R″), carboxamidomethyl (—CH$_2$—CO—NR″$_2$, in which one or both R's can be hydrogen, alkyl such as methyl, ethyl, butyl, lauryl, octadecyl, etc., alkyl, alkenyl, such as allyl, crotonyl, etc., aralkyl, such as benzyl, or aryl, such as phenyl, naphthyl, etc.) and cyanomethyl (—CH$_2$CN).

The carboxymethyl thiosulfate salts are prepared from a halogeno-acetic acid, such as chloracetic or bromoacetic acid, by refluxing with a water soluble thiosulfate, such as potassium or sodium thiosulfate in aqueous solution. They are isolated by evaporation of the reaction mixture or by metathesis with other metal cations such as calcium, barium, strontium, lead, aluminum, cobalt, copper, iron, mercury, zinc, and the like, which form less soluble salts or with organic cations such as substituted ammonium, thiuronium, sulfonium, or phosphonium. The esterified carboxymethyl thiosulfate salts are similarly prepared from the corresponding halogeno-acetic ester. In general, they are less soluble in water and more easily isolated by concentration and cooling of the residual mixture. In all cases, such concentration should be carried out under reduced pressure in order to reduce thermal decomposition of the thiosulfate ester salts. By reacting the inorganic thiosulfate with a halogeno-acetamide such as chloracetamide, bromoacetanilide, chloracetodiethylamide, chloracetylmorpholide, and the like, the corresponding S-carboxamidomethyl thiosulfate salt is obtained. Similarly, chloracetonitrile or bromoacetonitrile gives the corresponding S-cyanomethyl thiosulfate salt. In the preparation of any of these thiosulfate ester salts where the starting halogen compound is not too soluble in water, it is recommended that alcohol or dioxane be added to the reaction medium or used as the reaction medium.

The reaction which forms the process of this invention, may be schematically written (using 2-naphthol and sodium S-carboxymethyl thiosulfate as the reactants) as follows:

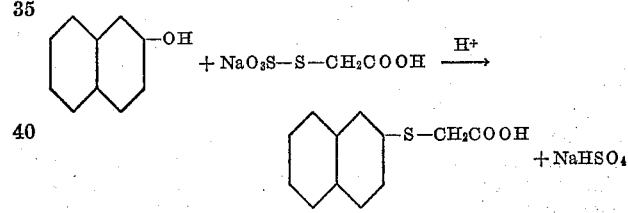

In the practice of this invention, the thiosulfate ester salt is isolated from the reaction mixture (usually aqueous solution) in which it is formed, either by evaporation of the solution, by salting out, or by precipitation of an insoluble salt. The isolated thiosulfate ester salt is then used in the reaction with the naphthol or its ethers to prepare the naphthyl thioglycollic acid. The thiosulfate ester salt, the naphthol, and the acid catalyst are heated together and the naphthyl thioglycollic acid or its derivative is isolated. The isolation involves basification of the reaction mixture and hydrolysis when the carboxy ester, amide, or nitrile is used since, although there is some hydrolysis during the reaction, a substantial portion of these groups survive the reaction unchanged.

The catalysts usable in the process of our invention are acid-type catalysts, such as acid salts (e. g., sodium or potassium bisulfate), organic sulfonic acids (alkyl or aromatic), inorganic acids (sulfuric, phosphoric, polyphosphoric, hydrochloric, hydrobromic), and the like.

The salts of S-ester of thiosulfuric acid condense with such naphthalene derivatives as naphthols and their lower aliphatic ethers, such as their alkyl, alkenyl, and aralkyl ethers. These are exemplified by 1-naphthol, 2-naphthol, 2-naphthylmethyl ether, 1-naphthylmethyl ether, 2-naphthylethyl ether, 2-naphthylallyl ether, 2-naphthylpropyl ether, 1-naphthylbutyl ether, 2-naphthylbenzyl ether, 5-carboxy-2-naphthol, 7-sulfo-2-naphthol, 3-methyl-2-naphthol, and the like.

The reaction mixture is usually heated to a temperature of 70–125° C. Reaction is obtained however at temperatures from about room temperature to about 175° C., and sometimes higher. Excessive temperatures however tend to favor autodecomposition of the thiosulfuric ester salts with the formation of undesirable by-products. After the reaction is complete, the mixture is diluted with water and the reaction product is isolated by filtration. In the case of the ester, amides, and nitriles, the diluted reaction mixture can be heated, or basified and heated, to effect hydrolysis of the ester, amide or nitrile grouping to the free carboxylic acid. To some extent such hydrolysis may occur in the reaction mixture of the thiosulfate ester salt and the naphthol.

It is an advantage of this process of our invention, as compared with the process involving the reaction of naphthols with thioglycollic acid, claimed in our co-pending application Serial No. 621,199, filed November 9, 1956, of which this is a division, that the cost is greatly reduced. Thioglycollic acid is difficult to isolate from the aqueous solutions in which it is usually formed, because of its solubility, and is therefore more expensive than the thiosulfuric ester salts. This process of our invention thus permits the manufacture of naphthyl thioglycollic acids very readily from cheap intermediates with a minimum of manipulation.

Our invention can be further illustrated by the following examples in which parts are by weight unless otherwise illustrated.

Example 1

28.8 parts of 2-naphthol, 50 parts of crude sodium carboxymethyl thiosulfate (previously prepared by reaction of chloroacetic acid and sodium thiosulfate in aqueous solution, followed by evaporaation of the reaction mixture) and 40 parts of p-toluenesulfonic acid are reacted at 104–108° C. until the reaction is substantially complete under nitrogen. The reaction mixture is washed by decantation with 400 parts of 0–5° C. water and finally dissolved in 2000 parts of water to which 20% caustic is added until the solution is just alkaline to Brilliant Yellow paper. The insoluble matter is removed by filtration and the filtrate is acidified with concentrated hydrochloric acid. The naphthyl thioglycollic acid is filtered, washed with water and dried at 70–80° C.

Similarly, by using an equivalent amount of 1,5-naphthalene diol and twice the quantity of sodium carboxymethyl thiosulfate, one obtains naphthalene 1,5-bis-thioglycollic acid. By using the same quantity of the thiosulfate with the diol as with naphthol, one obtains 1-naphthol-5-thioglycollic acid.

If, in the above procedure, 2-naphthol methyl ether is used in place of 2-naphthol, the same naphthyl thioglycollic acid is obtained.

Example 2

Two hundred and fifty parts of crystalline sodium thiosulfate is dissolved in 300 parts of water and the solution is diluted with 100 parts of alcohol 122.5 parts of ethyl chloracetate is added and the mixture is refluxed until the reaction is complete. The mixture is evaporated under a vacuum to about 330 parts by volume and the precipitate sodium chloride is filtered. The filtrate is then evaporated to dryness under a vacuum. The product is a mixture of salt and sodium S-carbethoxymethyl thiosulfate.

A mixture of 28.8 parts of 2-naphthol, 40 parts of mixed toluene sulfonic acid and 47 parts of the above crude sodium S-carbethoxymethyl thiosulfate is heated with stirring under nitrogen at 103–110° C. until the reaction is substantially complete. The reaction mixture is diluted with 1580 parts of water and 20 parts of sodium hydroxide is added. The mixture is boiled until saponification is complete and the solution is then separated by decantation from tarry residue. Acidification of the solution yields 2-naphthyl thioglycollic acid.

Example 3

To a solution of 250 parts of $Na_2S_2O_3.5H_2O$ in 300 parts of water is added a solution of 93.5 parts of chloracetamide in 200 parts of water. The mixture is heated to 80° C. until the reaction is substantially complete. It is then evaporated to dryness under a vacuum to give a mixture of NaCl and sodium S-carboxamidomethyl thiosulfate ($NaO_3S$—S—$CH_2$—$CONH_2$).

A mixture of 54.4 parts of the above mixture, 28.8 parts of 2-naphthol and 60 parts of mixed toluene sulfonic acids is stirred and heated to 110° C. until the reaction is substantially complete. It is then diluted with 1580 parts of water and 20 parts of sodium hydroxide and heated until hydrolysis is substantially complete. The mixture is then clarified and the filtrate acidified, to yield 2-naphthyl thioglycollic acid.

Example 4

The procedure of Example 3 is followed except that an equivalent amount of chloroacetonitrile is used in place of the chloracetamide. The reaction mixture is again diluted with water, made alkaline and heated until hydrolysis to the acid is complete. Again, 2-naphthyl thioglycollic acid is obtained.

Example 5

The procedure of Example 3 is followed using an equivalent amount of chloracetdimethylamide in place of the chloracetamide. Again, naphthyl thioglycollic acid is obtained. Similarly, chloracetanilide and chloracetmorpholide can be substituted for chloracetamide.

We claim:
1. A process for the preparation of S-thioglycollic acid derivatives of naphthalene in which the naphthalene ring is directly bonded to sulfur which comprises heating to a temperature between ambient and 175° C. a mixture of a naphthalene containing substituents selected from the group consisting of oxy and lower alkoxy groups with a salt of an S-ester of thiosulfuric acid of the structure: MO—$SO_2$—S—$CH_2$—X in which M is a cation other than hydrogen, and X is of the group consisting of carboxy, carboxy esters, carboxamide, substituted carboxamides, and nitrile, in the presence of an acid catalyst.

2. The process of claim 1 in which the naphthalene derivative is an oxynaphthalene and in which X is COOH.

3. The process of claim 2 in which the carboxymethyl thiosulfate salt is a sodium salt used in the form of a crude reaction product.

4. The process of claim 3 in which the catalyst is p-toluenesulfonic acid.

5. The process of claim 4 in which the naphthol is beta-naphthol.

6. The process of claim 4 in which the naphthalene derivative is a dioxynaphthalene.

7. The process of claim 6 in which the dioxynaphthalene is 1,5-dioxynaphthalene.

8. The process of claim 1 in which the naphthalene is an oxynaphthalene and X is an esterified carboxylic acid group.

References Cited in the file of this patent

FOREIGN PATENTS 814,596     Germany _____ Sept. 24, 1951